United States Patent [19]

Suzuki et al.

[11] Patent Number: 4,932,731

[45] Date of Patent: Jun. 12, 1990

[54] HOLOGRAPHIC HEAD-UP DISPLAY APPARATUS

[75] Inventors: Yoshiyuki Suzuki; Tatsumi Ohtsuka; Masao Suzuki, all of Shizuoka; Shunji Ohtsuji, Tokyo, all of Japan

[73] Assignee: Yazaki Corporation, Japan

[21] Appl. No.: 377,042

[22] Filed: Jul. 10, 1989

Related U.S. Application Data

[63] Continuation of Ser. No. 120,378, Nov. 13, 1987.

[30] Foreign Application Priority Data

Nov. 14, 1986 [JP]  Japan ................................. 61-269746

[51] Int. Cl.⁵ .......................... G02B 5/32; G02B 27/14
[52] U.S. Cl. ...................................... 350/3.7; 350/174
[58] Field of Search ................................. 350/3.7, 174

*Primary Examiner*—Bruce Y. Arnold
*Assistant Examiner*—David R. Parsons
*Attorney, Agent, or Firm*—Wigman & Cohen

[57] ABSTRACT

In a head-up display such that display images of instruments within a dashboard can be projected upon part of a windshield of an automotive vehicle, the holographic head-up display apparatus comprises a light emitting display unit; a transmissive hologram plate; and a reflective hologram plate. Since visible display images can be seen by the driver after having been passed through the transmissive hologram plate and reflected from the reflective hologram plate, blur of the display image due to chromatic aberration can be cancelled out, thus providing clear head-up instrument images.

7 Claims, 6 Drawing Sheets

F I G. 1 B
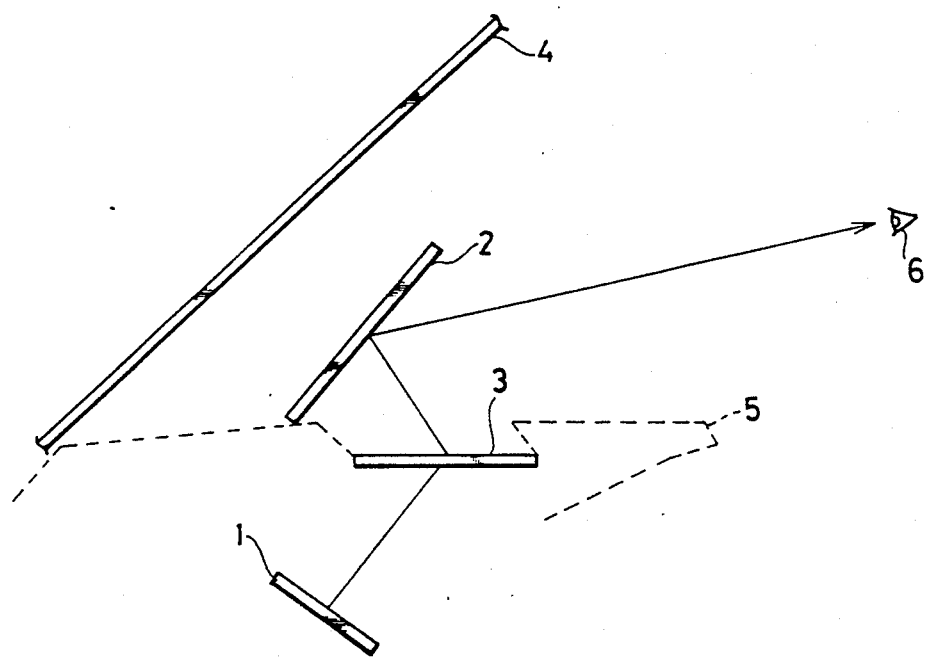

F I G. 4A
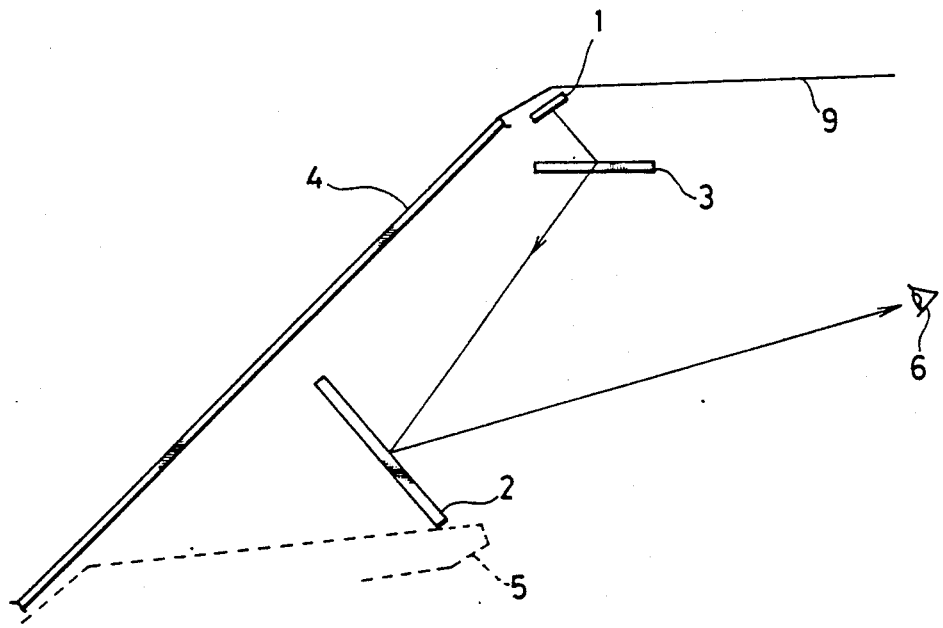

HOLOGRAPHIC HEAD-UP DISPLAY APPARATUS

This is a continuation of co-pending application Ser. No. 07/120,378 filed on Nov. 13, 1987.

BACKGROUND OF THE INVENTION

1. Field of the Invention

The present invention relates to a halographic head-up display apparatus, and more specifically to a holographic display apparatus provided with means for eliminating blur (unclearness is displayed images) due to chromatic aberration caused through the display apparatus.

2. Description of the Prior Art

An example of holographic head-up display apparatus is disclosed in U.S. Pat. No. 4218111. In this patent, a series of relay lens and a narrow-band high luminance cathode ray tube (CRT) are incorporated in the apparatus in order to eliminate the influence of chromatic aberration upon displayed images which are produced by projecting CRT display images on a reflective hologram diffraction grating (plate). Therefore, this display apparatus involves some disadvantages such that the optical system is complicated and therefore the light efficiency is low or the display apparatus is heavy and large in size.

To overcome the above-mentioned drawbacks, U.S. Pat. No. 4613200 (HEAD-UP DISPLAY SYSTEM WITH HOLOGRAPHIC DISPERSION CORRECTING) discloses another display apparatus such that a pair of separate reflective hologram diffraction gratings manufactured under the same manufacturing conditions are arranged in parallel to each other in order to compensate a display image for chromatic aberration. In this apparatus, however, there exist other problems such that the two hologram diffraction gratings are required to be arranged under severe restriction or it is difficult to perfectly coincide the characteristics of two hologram diffraction gratings with each other.

The above-mentioned two U.S. Patent Documents are incorporated herein by reference.

Further, in this specification, a holographic head-up display implies an image obtained by a combination of an outside direct view as for example that of a car driver with superimposed light from another source (instrument images) by use of diffraction optics as a combining and collimating element.

SUMMARY OF THE INVENTION

With these problems in mind, therefore, it is the primary object of the present invention to provide a holographic head-up display apparatus which can effectively eliminate chromatic aberration without increasing the weight and size of the apparatus so as to be applicable to various industrial fields.

To achieve the above-mentioned object, a holographic head-up display apparatus according to the present invention comprises: (a) light emitting display means for generating visible display light; (b) transmissive hologram diffraction grating means for transmissively diffracting the visible display light emitted from said light emitting display means; (c) reflective hologram diffraction grating means for reflectively diffracting the visible display light transmissively diffracted through said transmissive hologram diffraction grating means toward an observer so that the observer can recognize a clear virtual image free from chromatic aberration of the visible display light emitted from said light emitting display means.

The transmissive hologram diffraction grating means is formed by irradiating a hologram dry plate with two light sources located on the same side of the transmissive hologram diffraction grating means, while the reflective hologram diffraction grating means is formed by irradiating a hologram dry plate with two light sources located on both sides of the reflective hologram diffraction grating means. When the apparatus of the present invention is applied to an automotive vehicle, the light emitting display means and the transmissive hologram diffraction grating means are arranged in or on the dashboard or the ceiling of the automotive vehicle, while the reflective hologram diffraction grating means is arranged on the windshield or the dashboard.

When the apparatus according to the present invention is applied to an automotive vehicle, since the visible light emitted from the light emitting display means is passed through the transmissive hologram plate and then reflected from the reflective hologram plate, any difference in diffraction angle of the wide-band visible light is cancelled out, so that the driver can see a clear virtual image in front of the windshield without blur due to chromatic aberration.

BRIEF DESCRIPTION OF THE DRAWINGS

The features and advantages of the holographic head-up display apparatus according to the present invention will be more clearly appreciated from the following description of the preferred embodiment of the invention taken in conjunction with the accompanying drawings in which like reference numerals designate the same or similar elements or sections throughout the figures thereof and in which:

FIG. 1B is an illustration showing a modification of the holographic head-up display apparatus shown in FIG. 1A;

FIG. 4A is an illustration showing another embodiment of the holographic head-up display apparatus according to the present invention.

DETAILED DESCRIPTION OF THE PREFERRED EMBODIMENTS

Figure 1A:
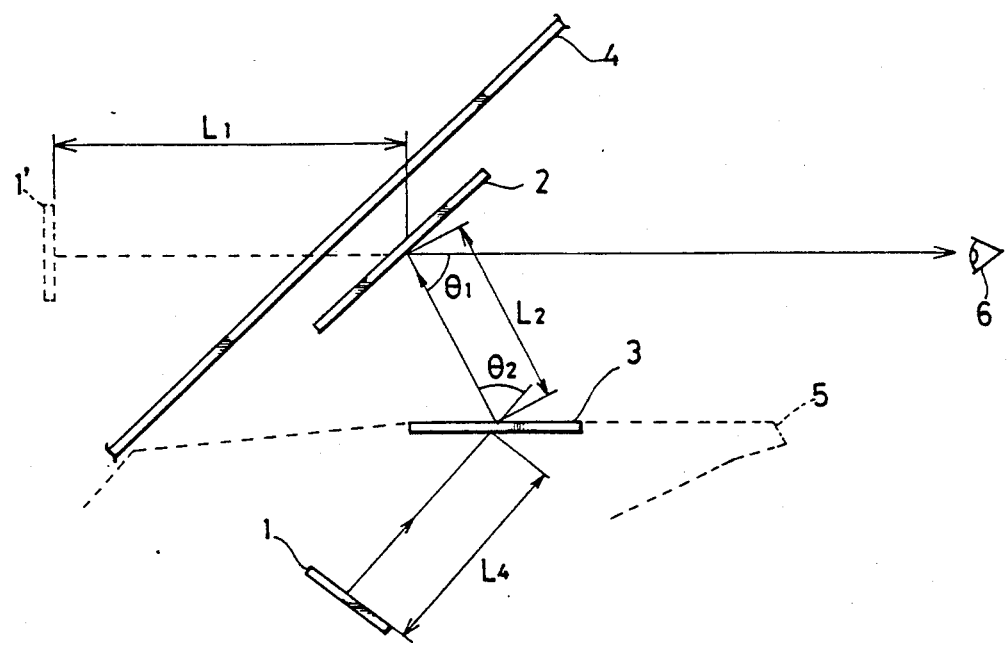
FIG. 1A is an illustration showing an embodiment of the holographic head-up display apparatus according to the present invention.

Embodiments of the present invention will be described hereinbelow with reference to the attached drawings. FIG. 1A shows an embodiment of the present invention, in which the holographic head-up display apparatus is mounted on a vehicle. By use of the head-up display apparatus, the driver 6 can see both a direct view through a windshield 4 and an image 1' from a light emitting display unit 1 in superimposed positional relationship to each other. In other words, the driver can see a display image 1' at the lower side of the windshield 4, without turning his face downward to see the display unit 1 arranged in a dashboard 5. In FIG. 1A, a display image of the light emitting display unit 1 is passed through a transmissive hologram diffraction grating and then reflected by a reflective hologram diffraction grating 2 to the driver's eye 6.

The light emitting display unit 1 is a fluorescent character display tube unit, for instance. These light emitting display unit 1 and the transmissive hologram diffraction grating 3 are disposed within the dashboard 5, and the reflective hologram diffraction grating 2 is disposed on the compartment side of the windshield 4 with an appropriate means.

When the light emitting display unit 1 emits light for display, the visible light emitted therefrom is passed through the transmissive hologram diffraction grating 3, and then allowed to be incident upon the reflective hologram diffraction grating 2. That is, the light emitting display image from the light emitting display unit 1 is projected upon the reflective hologram diffraction grating 2, so that a virtual image 1' of the light emitting display unit 1 is focused in front of the windshield 4.

Therefore, the driver can see the virtual image 1' within his visual field while seeing an external scene through the windshield 4 in superimposed relationship to each other.

Further, in the drawing, the angles $\theta_1$, $\theta_2$ and the distances $L_1$, $L_2$, $L_4$ are determined on the basis of the driver's eye position 6 and the virtual image position 1'.

Further, as depicted in FIG. 1B, it is also possible to dispose the reflective hologram diffraction grating 2 on the dashboard 5.

Figure 2A:
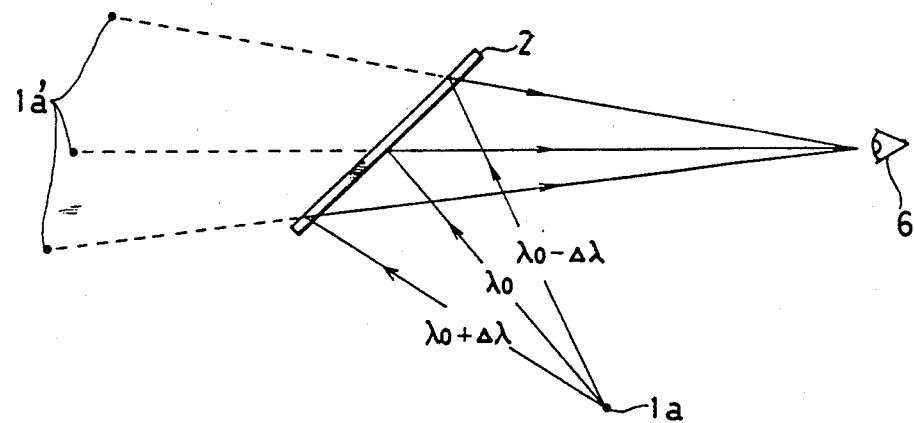
FIG. 2A is an illustration for assistance in explaining blur of a display image due to chromatic aberration.

Prior to description of the cancellation operation of the holographic display apparatus constructed as described above, the unclearness (blur) of an display image due to chromatic aberration in the reflective hologram diffraction grating 2 will be described with reference to FIG. 2A. In FIG. 2A, the visible light from a point $1a$ of the light emitting display unit 1 is represented as straight lines by three beams having three kinds of wavelengths of $\lambda_0$, $\lambda_0+\Delta\lambda$, and $\lambda_0-\Delta\lambda$, where $\lambda_0$ denotes a central wavelength of a light emitting spectrum and $2\Delta\lambda$ denotes a half-width of the spectrum, so that three virtual images $1a'$ of a point $1a$ are formed in front of the reflective hologram diffraction grating 2. Although being shown exaggeratedly and therefore the distances of these three virtual images are very close to each other in practice, the display image is seen unclearly due to the chromatic aberration, as shown in FIG. 2A.

Figure 2B:
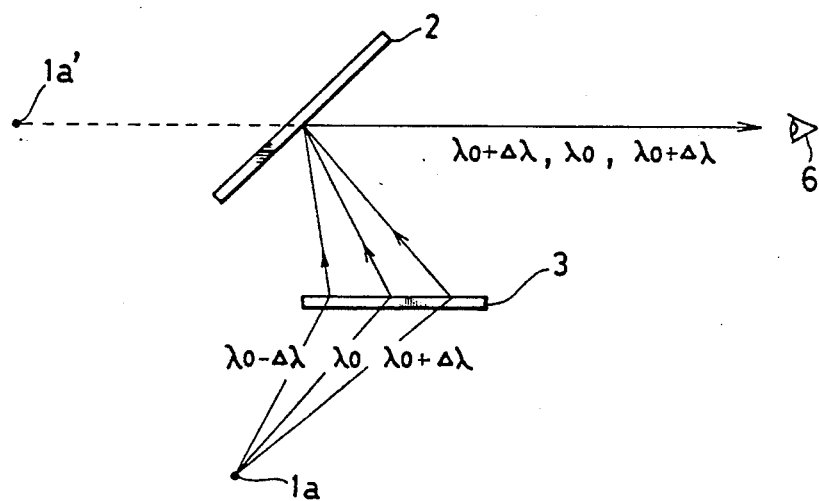
FIG. 2B is an illustration for assistance in explaining a way of cancellation of chromatic aberration in the present invention.

FIG. 2B shows the status where the above-mentioned chromatic aberration can be cancelled by the apparatus of the present invention to improve the image unclearness. In the drawings, differences in diffraction angles in the three beams having three kinds of wavelengths $\lambda_0+\Delta\lambda$, $\lambda_0$, $\lambda_0-\Delta\lambda$ emitted from the point $1a$ and reflected from the reflective hologram diffraction grating 2 are cancelled by the transmissive hologram diffraction grating 3 before reaching the eye 6 of the observer, so that the observer can recognize the virtual image $1a'$ of the point $1a$ as roughly a point image.

Although the diffraction gratings shown in FIG. 2B are not parallel, they correspond as follows:

| FIG. 2B of this application | FIG. 2 of U.S. Pat. No. 4,613,200 |
|---|---|
| $1a'$ | p' |
| 2 | HOE #2 |
| 3 | HOE #1 |
| $1a$ | p | to the apparatus shown in FIG. 2 of U.S. Pat. No. 4,613,200.

Figure 3A:
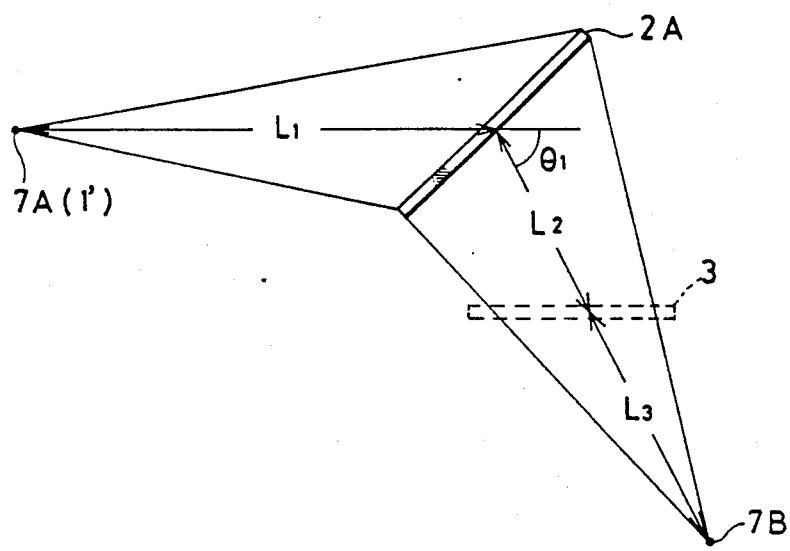
FIG. 3A is an illustration for assistance in explaining a way of forming a reflective hologram diffraction grating of the present invention.
Figure 3B:
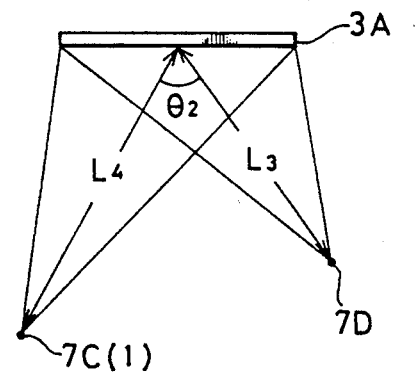
FIG. 3B is an illustration for assistance in explaining a way of forming a transmissive hologram diffraction grating of the present invention.

FIGS. 3A and 3B show the mutual positional relationship between two light sources 7 and a hologram photosensitive dry plate 2A or 3A or the reflective hologram diffraction grating 2 or the transmissive hologram diffraction grating 3 in order to form interference patterns. In both cases, the hologram photosensitive dry plate 2A or 3A is irradiated with two diffused lights of spherical surface to produce interference patterns or interference gratings. However, in the reflective hologram diffraction grating 2, the hologram dry plate 2A is irradiated on both the sides; while in the transmissive hologram diffraction grating 3, the hologram dry plate 3A is irradiated on a single side thereof.

In FIG. 3A, $L_1$ denotes a distance between a virtual image position required to be seen in use and the center of the reflective hologram diffraction grating 2; $L_2$ denotes a distance between the center of the reflective hologram diffraction grating 2 and that of the transmissive hologram diffraction grating 3 in use; $\theta_1$ denotes an angle between the reflective and transmissive hologram diffraction gratings 2 and 3. Further, $L_3$ denotes a distance as explained below with reference to FIG. 3A.

In FIG. 3B, $L_4$ denotes a distance in use between the center of the light emitting display unit 1 and that of the transmissive hologram diffraction grating 3. Further, no absolute restriction exists in determination of the distance $L_3$ and the angle $\theta_2$, these values are related to the degree of blur of the display image in conjunction with the positions of the light emitting display unit 1 and the transmissive hologram diffraction grating 3 in use.

FIG. 4A shows another arrangement of the holographic head-up display apparatus of the present invention.

In the embodiment shown in FIG. 1A, the light emitting display unit 1 and the transmissive hologram diffraction grating 3 are both arranged within the dashboard 5. However, these can be disposed at a ceiling 9 of the vehicle compartment as shown in FIG. 4A. In this embodiment, the reflective hologram diffraction grating 2 is disposed on the dashboard 5 in turn as shown.

The arrangement as shown in FIG. 4A is effective when there exists no sufficient space to mount the light emitting display unit 1 or the transmissive hologram diffraction grating 3 near the dashboard 5, because various instruments and devices are arranged within the vehicle dashboard 5, or when the apparatus of the present invention is mounted on an already-manufactured automotive vehicle.

Figure 4B:
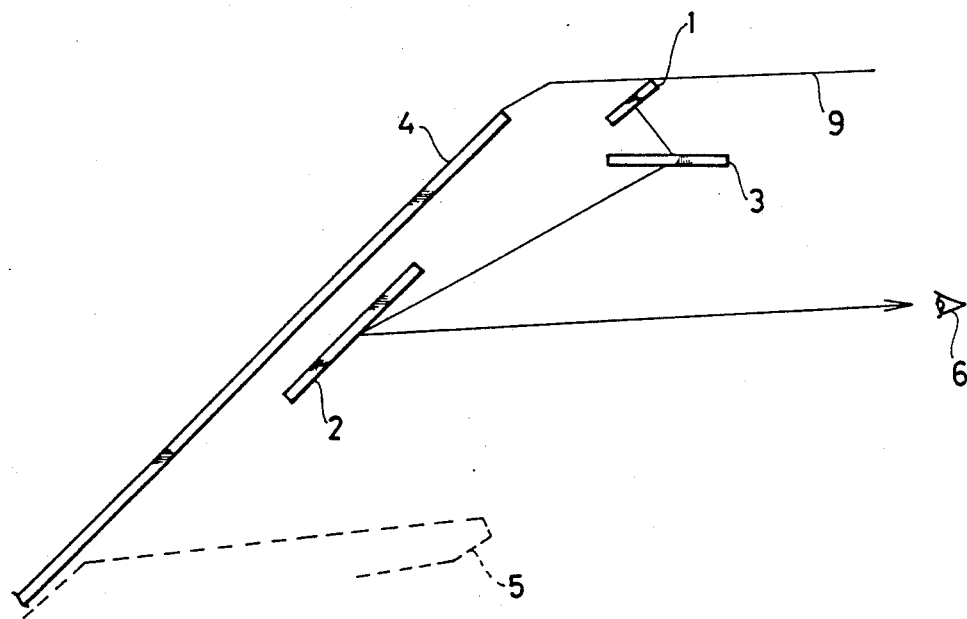
FIG. 4B is an illustration showing a modification of the holographic head-up display apparatus shown in FIG. 4A.

Further, as depicted in FIG. 4B, it is also possible to dispose the reflective hologram diffraction grating 2 on the windshield 4.

As described above, in the hologram head-up display apparatus according to the present invention, since chromatic aberration can be eliminated accurately by simply providing the transmissive hologram diffraction grating between the light emitting display unit and the reflective hologram diffraction grating, it is possible to obtain a clear image projected upon and reflected from the reflective hologram diffraction grating without use of a complicated optical system and to obtain a bright image by use of a wide-band light emitting display unit, without increasing the weight and size of the apparatus. Therefore, the apparatus of the present invention can be applied to various fields.

In particular, since the transmissive hologram diffraction grating is used for chromatic aberration cancellation of visible light, the light emitting display unit can be positioned freely relative to the reflective hologram diffraction grating and further the transmissive hologram diffraction grating is easy to manufacture in a mass production system.

What is claimed is:

1. A holographic head-up display apparatus which comprises:
   (a) light emitting display means for generating visible display light;
   (b) transmissive hologram diffraction grating means for transmissively diffracting the visible display light emitted from said light emitting display means;
   (c) reflective hologram diffraction grating means for reflectively diffracting the visible display light transmissively diffracted through said transmissive hologram diffraction grating means toward an observer so that the observer can recognize a clear virtual image free from chromatic aberration of the visible display light emitted from said light emitting display means.

2. The holographic head-up display apparatus as set forth in claim 1, wherein said transmissive hologram diffraction grating means is formed by irradiating a hologram dry plate with two light sources located on the same side of said transmissive hologram diffraction grating means in such a way a first light source is located a distance $L_4$ away from a center of the hologram dry plate so as to correspond to a position of said light emitting display means relative to said transmissive means and a second light source is located a distance $L_3$ away from the center thereof under consideration of chromatic aberration of the visible display light.

3. The holographic head-up display apparatus as set forth in claim 2, wherein said reflective hologram diffraction grating means is formed by irradiating a hologram dry plate with two light sources located on both sides of said reflective hologram diffraction grating means in such a way that a first light source is located a distance $L_1$ away from a center of the hologram dry plate so as to correspond to a position of the virtual image of the visible display light relative to said reflective means and a second light source is located a distance $L_2+L_3$ away from the center thereof, where $L_2$ denotes a distance between said two, transmissive and reflective, hologram diffraction grating means.

4. The holographic head-up display apparatus as set forth in claim 1, wherein said light emitting display means and said transmissive hologram diffraction grating means are arranged in or on a dashboard of an automotive vehicle, and said reflective hologram diffraction grating means is arranged on a windshield thereof.

5. The holographic head-up display apparatus as set forth in claim 1, wherein said light emitting display means and said transmissive hologram diffraction grating means are arranged in or on a dashboard of an automotive vehicle, and said reflective hologram diffraction grating means is arranged on a dashboard thereof.

6. The holographic head-up display apparatus as set forth in claim 1, wherein said light emitting display means and said transmissive hologram diffraction grating means are arranged on a ceiling of an automotive vehicle, and said reflective hologram diffraction grating means is arranged on a dashboard thereof.

7. The holographic head-up display apparatus as set forth in claim 1, wherein said light emitting display means and said transmissive hologram diffraction grating means are arranged on a ceiling of an automotive vehicle, and said reflective hologram diffraction grating means is arranged on a windshield thereof.

* * * * *